United States Patent
Moreton et al.

(10) Patent No.: US 7,151,543 B1
(45) Date of Patent: Dec. 19, 2006

(54) VERTEX PROCESSOR WITH MULTIPLE INTERFACES

(75) Inventors: Henry P. Moreton, Woodside, CA (US); Matthew N. Papakipos, Palo Alto, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 342 days.

(21) Appl. No.: 10/704,444

(22) Filed: Nov. 7, 2003

Related U.S. Application Data

(60) Provisional application No. 60/463,260, filed on Apr. 16, 2003.

(51) Int. Cl.
    G09G 5/39     (2006.01)
(52) U.S. Cl. ............... 345/531; 345/423; 345/520; 345/557
(58) Field of Classification Search ............... 345/531, 345/423, 520, 557, 419, 537
    See application file for complete search history.

(56) References Cited

U.S. PATENT DOCUMENTS

| | | | | |
|---|---|---|---|---|
| 6,943,797 | B1* | 9/2005 | Wasserman et al. | 345/506 |
| 6,975,322 | B1* | 12/2005 | Lavelle | 345/543 |
| 2003/0164823 | A1* | 9/2003 | Baldwin et al. | 345/419 |

* cited by examiner

Primary Examiner—Kimbinh T. Nguyen
(74) Attorney, Agent, or Firm—Patterson & Sheridan, L.L.P.

(57) ABSTRACT

Method and interface for sending vertex data output from a vertex processing unit to memory is described. Conventionally, the vertex data output is not output directly to memory via a dedicated write interface, but is instead passed through downstream computation units in a graphics processor and written to memory via the write interface normally used to write pixel data. When the downstream computation units are configured to pass the vertex data output through unmodified, processing of the vertex data output by the downstream computation units is deferred until a second pass through those units. When the vertex data output is output directly to memory, processing of the vertex data output by the downstream computation units can be initiated during a first pass through those units.

23 Claims, 15 Drawing Sheets

VERTEX PROCESSOR WITH MULTIPLE INTERFACES

CROSS-REFERENCE TO RELATED APPLICATION(S)

This application claims priority from commonly owned co-pending provisional U.S. Patent Application No. 60/463,260 entitled "Vertex Processor With Multiple Interfaces," filed Apr. 16, 2003, having common inventors and assignee as this application, which is incorporated by reference as though fully set forth herein.

FIELD OF THE INVENTION

The present invention generally relates to graphics processing and, more particularly, to vertex data processing and vertex data storage.

BACKGROUND

Current graphics data processing is includes systems and methods developed to perform a specific operation on graphics data, e.g., linear interpolation, tessellation, rasterization, texture mapping, depth testing, etc. Traditionally graphics processors include several fixed function computation units to perform such specific operations, and more recently, the computation units have a degree of programmability to perform user specified operations.

While computation units included in each graphics processor can vary, a common element is a sampling unit that processes graphics primitives (basic geometrical constructs, such as points, lines, triangles, quadrilaterals, meshes) and generates sub-primitive data (such as pixel data or fragment data). A graphics processor uses a sampling unit and computation units to convert graphics primitives into sub-primitive data and generate image data.

Graphics processors use memory to store graphics data and program instructions, where graphics data is any data that is input to or output from the computation units within the graphics processor. Graphics memory is any memory used to store graphics data or program instructions to be executed by the graphics processor. Graphics memory can include portions of system memory, local memory directly coupled to the graphics processor, register files coupled to the computation units within the graphics processor, and the like.

The computation units within some graphics processors are coupled to each other to form a graphics pipeline such that the output of a first computation unit is coupled to the input of a second computation unit to form a node. Subsequent computation units are coupled in sequence to form additional nodes. Additional computational units can be connected between two nodes to form parallel computational units. Within the graphics pipeline processing can proceed simultaneously within each of the computational units. Furthermore, processing can be performed in multiple passes through the graphics pipeline.

Recently the complexity of vertex processing used to create an image has increased due to the use of vertex programs. When vertex data generated using a vertex program will be processed to create several images it is desirable to store the vertex data in graphics memory. Conventional graphics processors pass the vertex data through the graphics pipeline, bypassing the computation units, and write the vertex data to graphics memory using an interface normally used to write pixel data. The portion of the graphics pipeline containing computation units that typically perform pixel computations is configured to pass the vertex data through to the interface normally used to write pixel data. Therefore pixel computations that are not performed during the first processing pass of data through the graphics pipeline are deferred to a subsequent processing pass.

Accordingly, it would be desirable to provide improved approaches to storing vertex data in graphics memory.

SUMMARY

A method and apparatus for processing and distributing processed vertex data for a graphics processor is described. A vertex processing unit within the graphics processor processes vertex data input to produce the processed vertex data. The vertex processing unit selectively stores a first portion of the processed vertex data in a memory. The vertex processing unit selectively outputs a second portion of the processed vertex data to a rasterizer.

A vertex processing unit includes a programmable computation unit configured to receive vertex data input to produce a first vertex data output and a second vertex data output, a memory interface for storing the first vertex data output in a graphics memory and a data interface for communicating the second vertex data output.

Alternatively, the vertex processing unit includes a programmable computation unit configured to receive vertex data input from the graphics memory or a vertex input buffer to produce vertex data output, a culling unit coupled to the programmable computation unit to receive the vertex data output and configured to filter the vertex data output to provide filtered vertex data output and a memory interface for storing one of the vertex data output and the filtered vertex data output in the graphics memory.

The vertex processing unit in this part of a computing system that includes a host processor, a host memory, the host memory storing programs for the host processor, a system interface configured to interface with the host processor and a graphics processor. The graphics processor includes the vertex processing unit. The vertex processing unit includes a programmable computation unit configured to receive vertex data input to produce a first vertex data output and a second vertex data output, a memory interface for storing a first vertex data output in the graphics memory and a data interface for communicating the second vertex data output.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
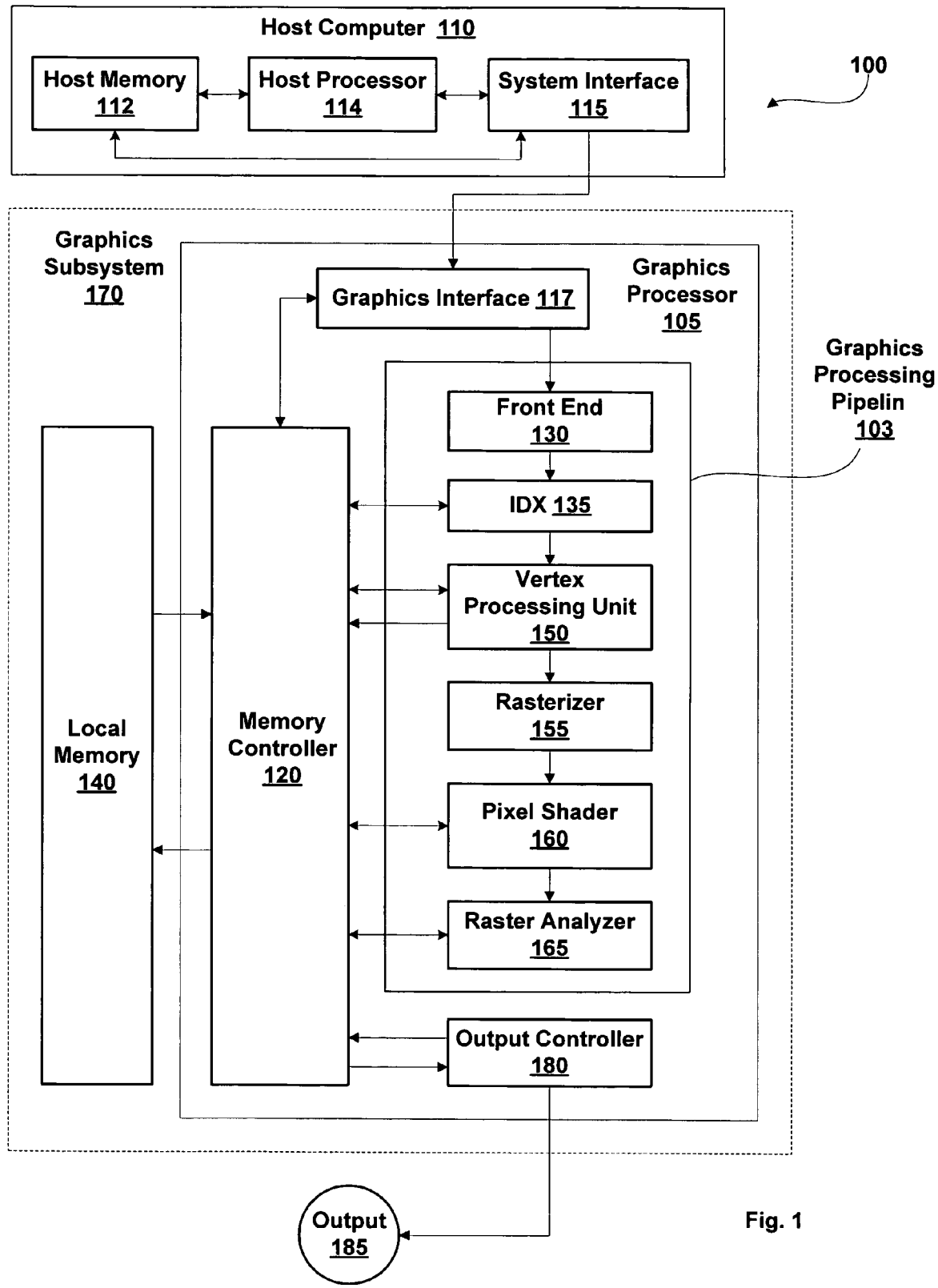
FIG. 1 is a block diagram of an exemplary embodiment of a respective computer system in accordance with one or more aspects of the present invention.

FIG. 1 is a block diagram of an exemplary embodiment of a Computing System generally designated 100 and including a Host Computer 110 and a Graphics Subsystem 170. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host Computer 110 communicates with Graphics Subsystem 170 via System Interface 115 and a Graphics Interface 117 within a Graphics Processor 105. Data received at Graphics Interface 117 can be passed to a Front End 130 within a Graphics Processing Pipeline 103 or written to a Local Memory 140 through Memory Controller 120. Memory Controller 120 is configured to handle data sizes from typically 8 to more than 128 bits.

Graphics Processing Pipeline 103 includes, among other computation units, Front End 130 that receives commands from Host Computer 110 via Graphics Interface 117. Front End 130 interprets and formats the commands and outputs the formatted commands to an IDX (Index Processor) 135. Some of the formatted commands are used by IDX 135 to initiate processing of data by providing information used to determine the location of program instructions or data stored in memory. IDX 135, a Vertex Processing Unit 150, a Pixel Shader 160 and a Raster Analyzer 165 each include an interface to Memory Controller 120 through which program instructions and data can be read from Local Memory 140 or Host Memory 112. When a portion of Host Memory 112 is used to store program instructions and data, the portion of Host Memory 112 can be uncached so as to increase performance of access by Graphics Processor 105.

IDX 135 reads program instructions and data from graphics memory and outputs the data and program instructions to Vertex Processing Unit 150. In an alternate embodiment, IDX 135 reads the program instructions from graphics memory and outputs the program instructions to Vertex Processing Unit 150 and Vertex Processing Unit 150 reads the data from graphics memory. Vertex Processing Unit 150 and Raster Analyzer 165 also each include a write interface to Memory Controller 120 through which data can be written to graphics memory.

Computation units Vertex Processing Unit 150, Rasterizer 155, Pixel Shader 160 and Raster Analyzer 165 each contain programmable computation units to perform a variety of specialized functions. Some of the specialized functions the programmable computation units perform are table lookup, scalar addition, vector addition, multiplication, division, coordinate-system mapping, calculation of vector normals, tessellation, calculation of derivatives, interpolation, and the like. Vertex Processing Unit 150, Pixel Shader 160 and Raster Analyzer 165 are each optionally configured such that data processing operations are performed in multiple passes through those units, in multiple passes through a combination of those units or in multiple passes through Graphics Processing Pipeline 103.

In a typical implementation Graphics Processing Pipeline 103 performs geometry computations, rasterization, and pixel computations. Therefore Graphics Processing Pipeline 103 is programmed to operate on surface, primitive, vertex, fragment, pixel, sample or any other data. For simplicity, the remainder of this description will use the term samples to refer to vertices, pixels, samples and fragments.

Samples output by Pixel Shader 160 are passed to Raster Analyzer 165, which performs near and far plane clipping and raster operations, such as stencil, z test, etc., and saves the results in graphics memory. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other Computing System 100, other Graphics Subsystem 170, or the like. In alternate embodiments, Graphics Processing Pipeline 103 includes additional computation units coupled in parallel or in series with the computation units shown in FIG. 1. For example, an additional Pixel Shader 160 may be included in parallel or in series with Pixel Shader 160.

Figure 2A:
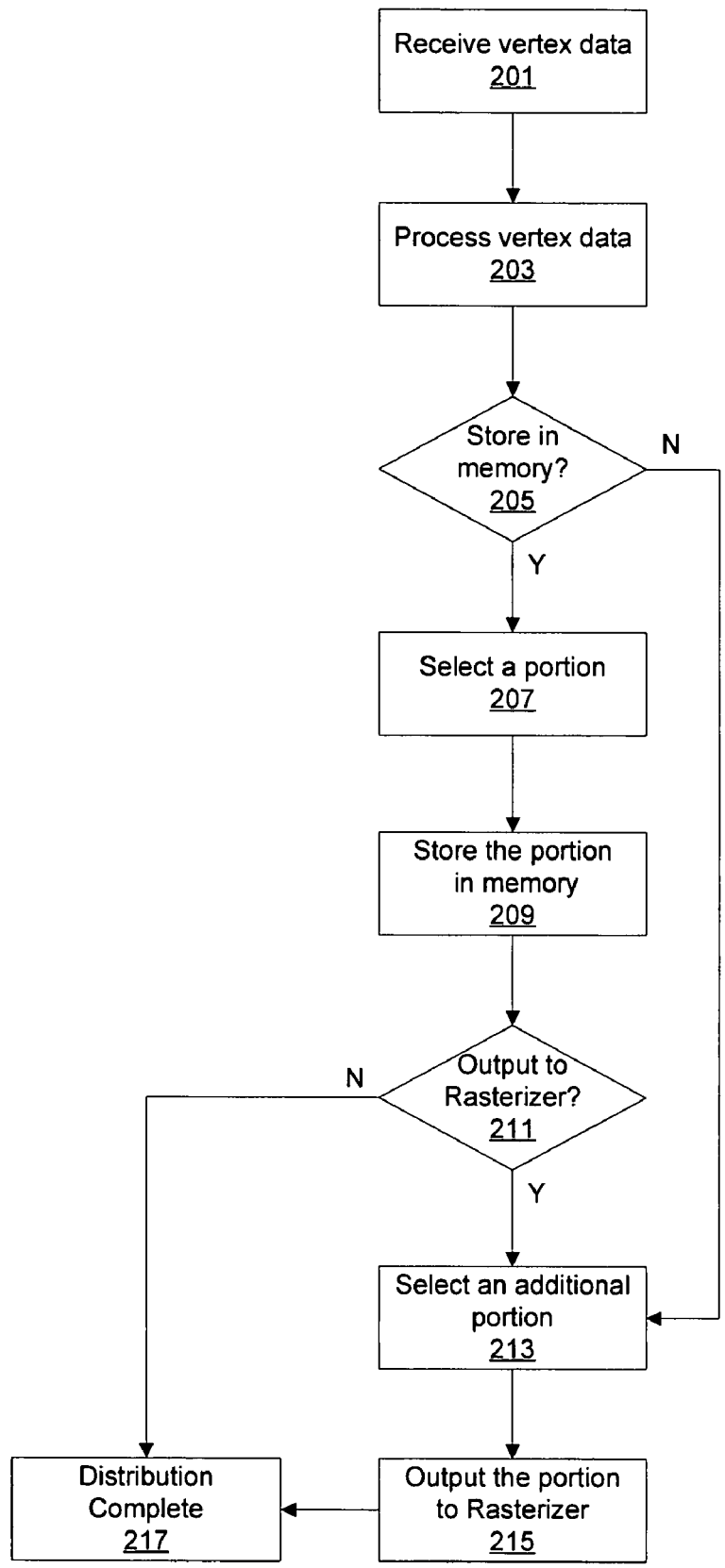
FIG. 2A is flow diagram of an exemplary embodiment of processing and distributing vertex data in accordance with one or more aspects of the present invention.

FIG. 2A is a flow diagram of an exemplary embodiment of processing and distributing vertex data. In step 201 Vertex Processing Unit 150 receives vertex data from IDX 135 or, alternatively, from graphics memory via Memory Controller 120. In step 203 Vertex Processing Unit 150 processes the vertex data to produce processed vertex data. In step 205 Vertex Processing Unit 150 determines if a first portion of the processed vertex data should be stored in a memory, and, if not, proceeds to step 213. If in step 205 Vertex Processing Unit 150 determines the first portion of the processed vertex data should be stored in the memory, in step 207 Vertex Processing Unit 150 selects the first portion of the processed vertex data, as described further herein. In step 209, Vertex Processing Unit 150 outputs the first portion of the processed vertex data to Memory Controller 120 and the first portion of the processed vertex data is stored in the memory.

In step 211 Vertex Processing Unit 150 determines if a second portion of the processed vertex data should be output to Rasterizer 155, and, if not, proceeds to step 217. If in step 211 Vertex Processing Unit 150 determines a second portion of the processed vertex data should be output to Rasterizer 155, Vertex Processing Unit 150 proceeds to step 213. In one embodiment, the second portion of the processed vertex data is the same as the first portion of the processed vertex data. In a second embodiment the second portion of the processed vertex data is exclusive of the first portion of the processed vertex data. In a third embodiment the second portion of the processed vertex data includes at least some of the first portion of the processed vertex data. In a fourth embodiment the first portion of the processed vertex data includes at least some of the second portion of the processed vertex data.

In step 213 Vertex Processing Unit 150 selects the second portion of the processed vertex data, as described further herein. In step 215, Vertex Processing Unit 150 outputs the second portion of the processed vertex data to Rasterizer 155. In step 217 Vertex Processing Unit 150 is done processing and distributing the vertex data.

Figure 2B:
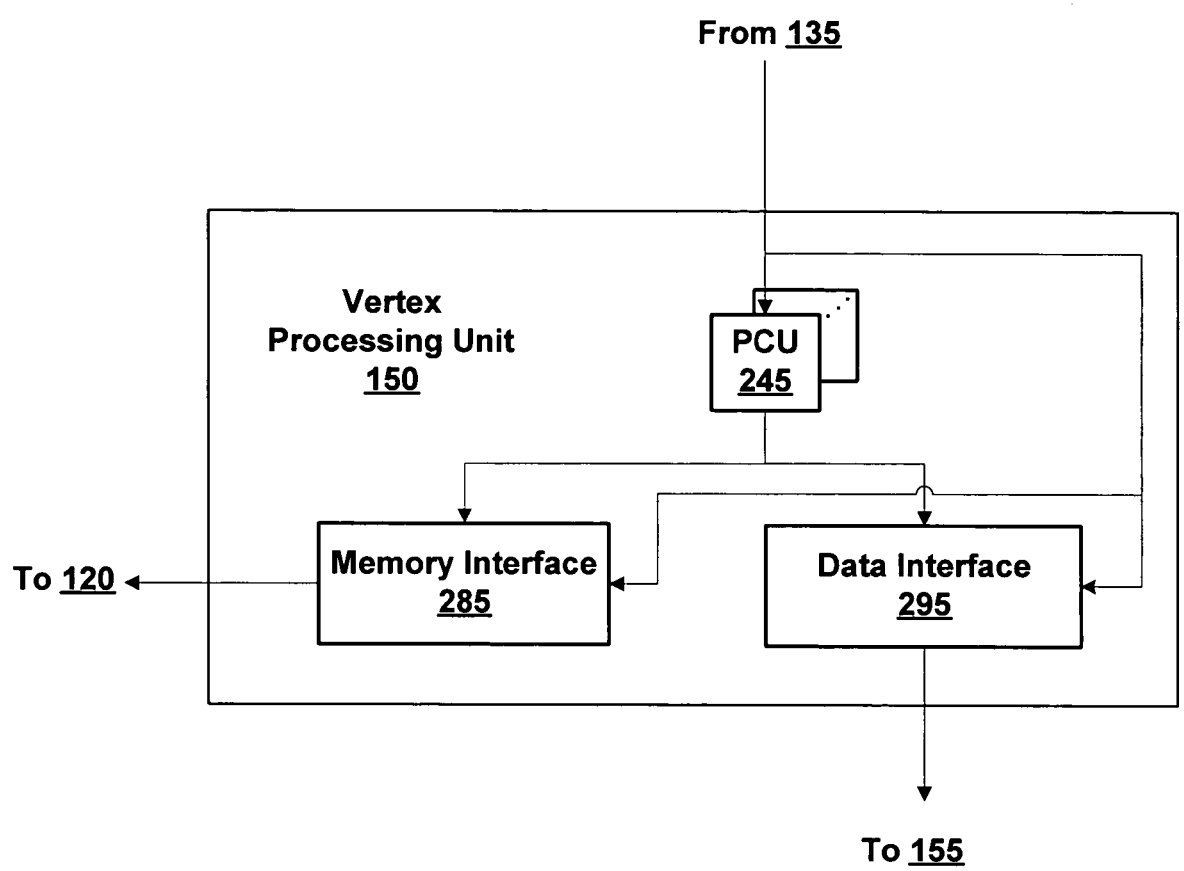
FIGS. 2B, 2C, and 2D are block diagrams of exemplary embodiments of a vertex processing unit in accordance with one or more aspects of the present invention.

FIG. 2B is a block diagram of an embodiment of Vertex Processing Unit 150. In this embodiment at least one PCU (programmable computation unit) 245 is used perform matrix transformations, lighting operations, vector calculations, tessellation, viewport transformations, user clipping, transformations to screen coordinates, and the like. The at least one PCU 245 receives vertex data input from IDX 135 to produce a first vertex data output and a second vertex data output. The at least one PCU 245 receives configuration signals from IDX 135 to control the computation performed by the at least one PCU 245. In one embodiment, the second vertex data output is the same as the first vertex data output. In a second embodiment the second vertex data output is exclusive of the first vertex data output. In a third embodiment the second vertex data output includes at least some of the first vertex data output. In a fourth embodiment the first vertex data output includes at least some of the second vertex data output. Memory Interface 285 receives the first vertex data output and stores the first vertex data output in graphics memory via Memory Controller 120. Likewise, Data Interface 295 receives the second vertex data output and communicates the second data output to a block in Graphics Processing Pipeline 103 such as Rasterizer 155. Data Interface 295 receives configuration signals from IDX 135. Memory Interface 285 receives configuration signals and indices indicating the location vertex data is optionally written to in graphics memory from IDX 135.

Figure 2C:
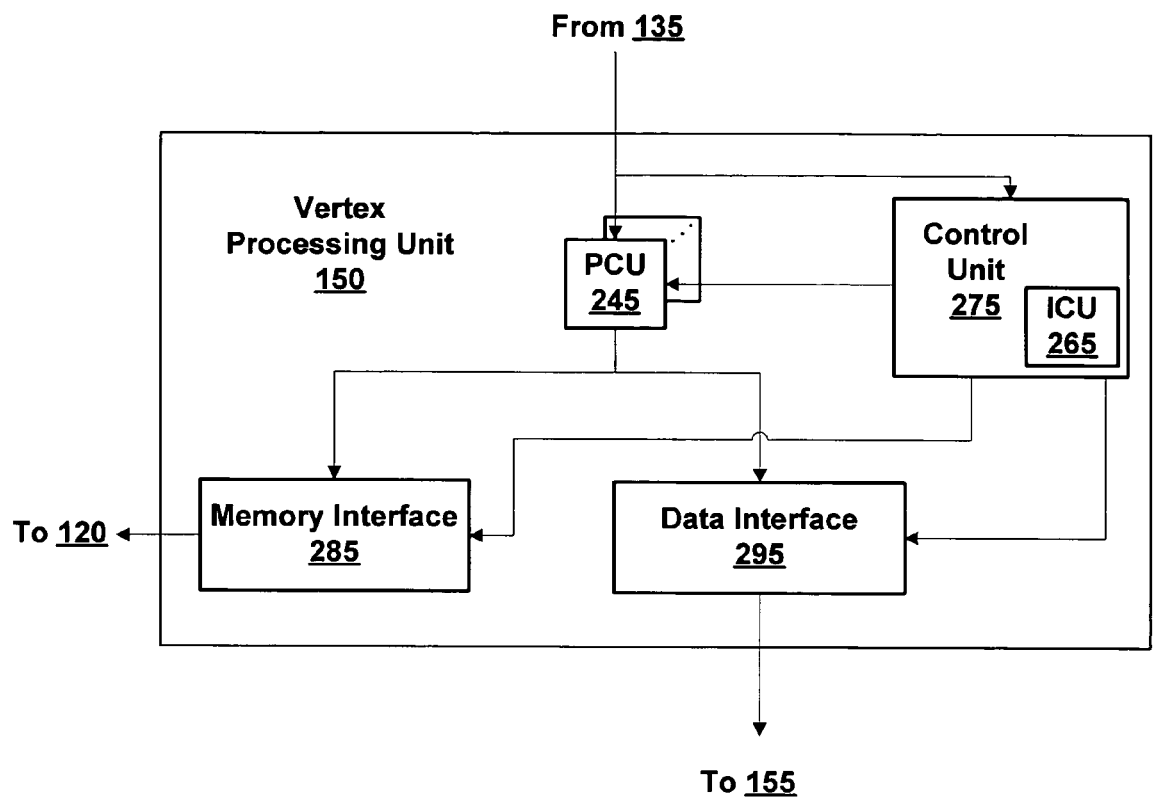

FIG. 2C is a block diagram of an alternate embodiment of Vertex Processing Unit 150. In addition to the blocks shown in FIG. 2B, this embodiment includes a Control Unit 275. Control Unit 275 receives indices and other configuration information from IDX 135. The configuration information specifies computations performed by the at least one PCU 245, computation precision, and the like. Control Unit 275 outputs configuration signals to the at least one PCU 245, Memory Interface 285 and Data Interface 295. Additionally, Control Unit 275 outputs indices produced by ICU 265 to Memory Interface 285. The configuration information can be derived from vertex program instructions or controlled by mode bits written via one or more register write instructions independent from a vertex program.

Figure 2D:
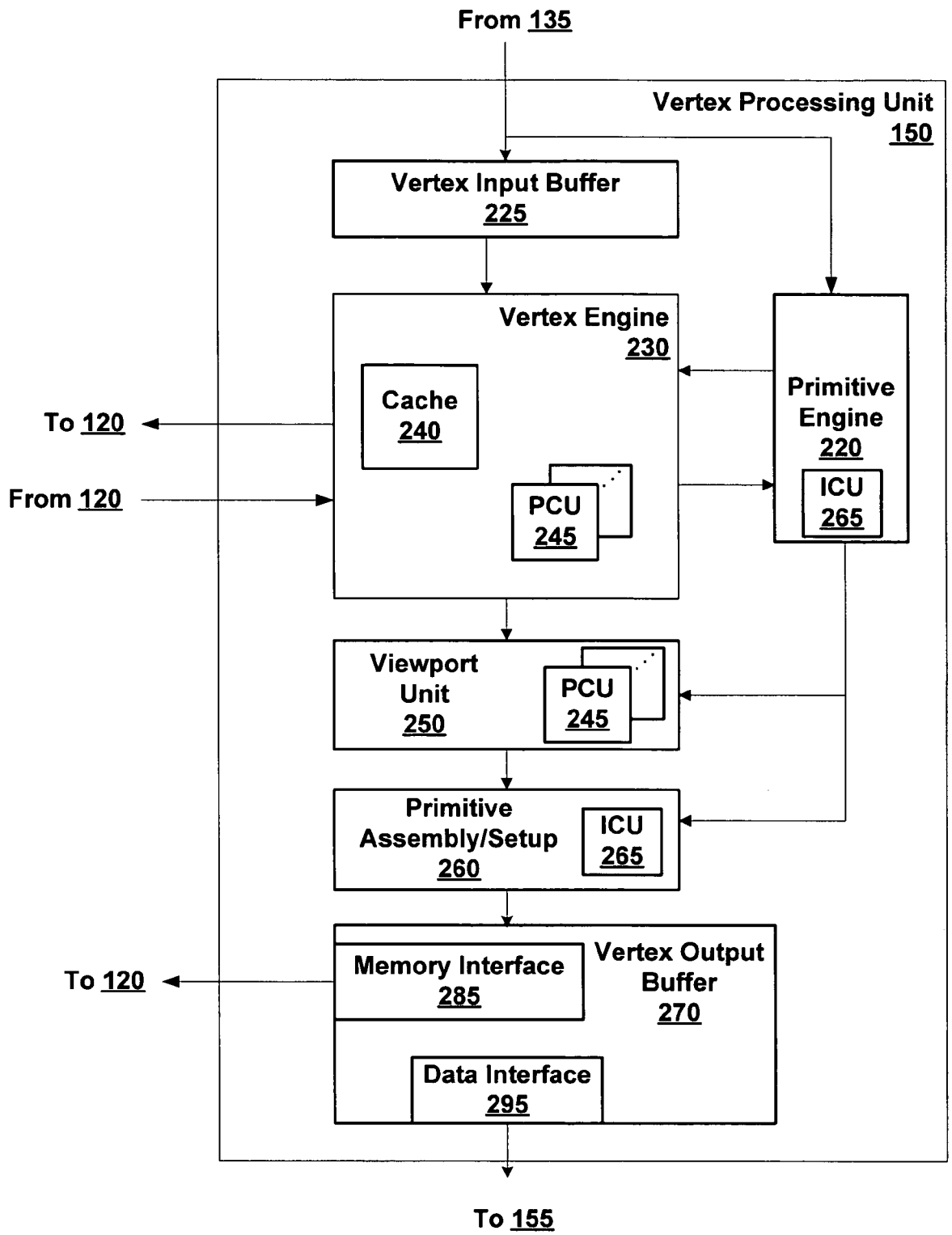

FIG. 2D is a block diagram of an alternate embodiment of Vertex Processing Unit 150. Vertex Processing Unit 150 receives program instructions and data and outputs processed and filtered vertex data, i.e., a first vertex data output and a second vertex data output. The first vertex data output is stored in graphics memory and the second vertex data output is output to Rasterizer 155. Vertex data includes at least one of geometric coordinates, color, map indices, time-based derivatives, user-defined parameters, and the like. It is desirable to store the first vertex data output to be used in subsequent passes through Vertex Processing Unit 150 rather than to regenerate the first vertex data output for each pass. Writing the first vertex data output from Vertex Processing Unit 150 to graphics memory via Memory Controller 120 permits the first vertex data output to be subsequently passed through or further processed by Vertex Processing Unit 150 while allowing the second vertex data output to be simultaneously processed and filtered by Rasterizer 155 and Pixel Shader 160.

A Vertex Input Buffer 225 receives the program instructions and data read from graphics memory by IDX 135 and optionally stores the program instructions and data in storage resources such as a register file, FIFO, cache, and the like. A Primitive Engine 220 receives the program instructions from IDX 135 and generates configuration information that is input to a Vertex Engine 230. In an alternate embodiment, the program instructions are received by Primitive Engine 220, Vertex Input Buffer 225 is omitted and Vertex Engine 230 reads data from graphics memory via Memory Controller 120. In either embodiment, a Cache 240 can be used to store vertex data read from graphics memory by IDX 135 or Vertex Engine 230.

The configuration information output by Primitive Engine 220 to Vertex Engine 230 configures PCUs 245 to perform functions such as matrix transformations, lighting operations, vector calculations, tessellation, and the like. Data generated by the PCUs 245 such as computed vertices, vector products, sign data, comparison results, and the like are output by Vertex Engine 230 to Primitive Engine 220. Processed vertex data is output by Vertex Engine 230 to a Viewport Unit 250.

Primitive Engine 220 generates configuration information that is input to Viewport Unit 250 and configures at least one PCU 245 within Viewport Unit 250. Viewport Unit 250 performs viewport transformations, viewport clipping, matrix translation to screen space, and the like. Viewport Unit 250 outputs further processed vertex data to a Primitive Assembly/Setup 260. Primitive Assembly/Setup 260 performs derivative computations, culling, and the like and generates processed and filtered vertex data as described further herein. Primitive Assembly/Setup 260 also receives indices from an ICU (Index Computation Unit) 265 within Primitive Engine 220. The indices can be used to determine the location vertex data is optionally written to in graphics memory. In an alternate embodiment, Primitive Assembly/Setup 260 generates the indices using an ICU 265 within Primitive Assembly/Setup 260 and receives information from Primitive Engine 220 indicating which processed and filtered vertex data to write to graphics memory. Primitive Assembly/Setup 260 outputs the processed and filtered vertex data and corresponding indices to a Vertex Output Buffer 270. Vertex Output Buffer 270 includes a Memory Interface 285 coupled to graphics memory via Memory Controller 120. Vertex Output Buffer 270 also includes a Data Interface 295 coupled to Rasterizer 155.

Figure 2E:
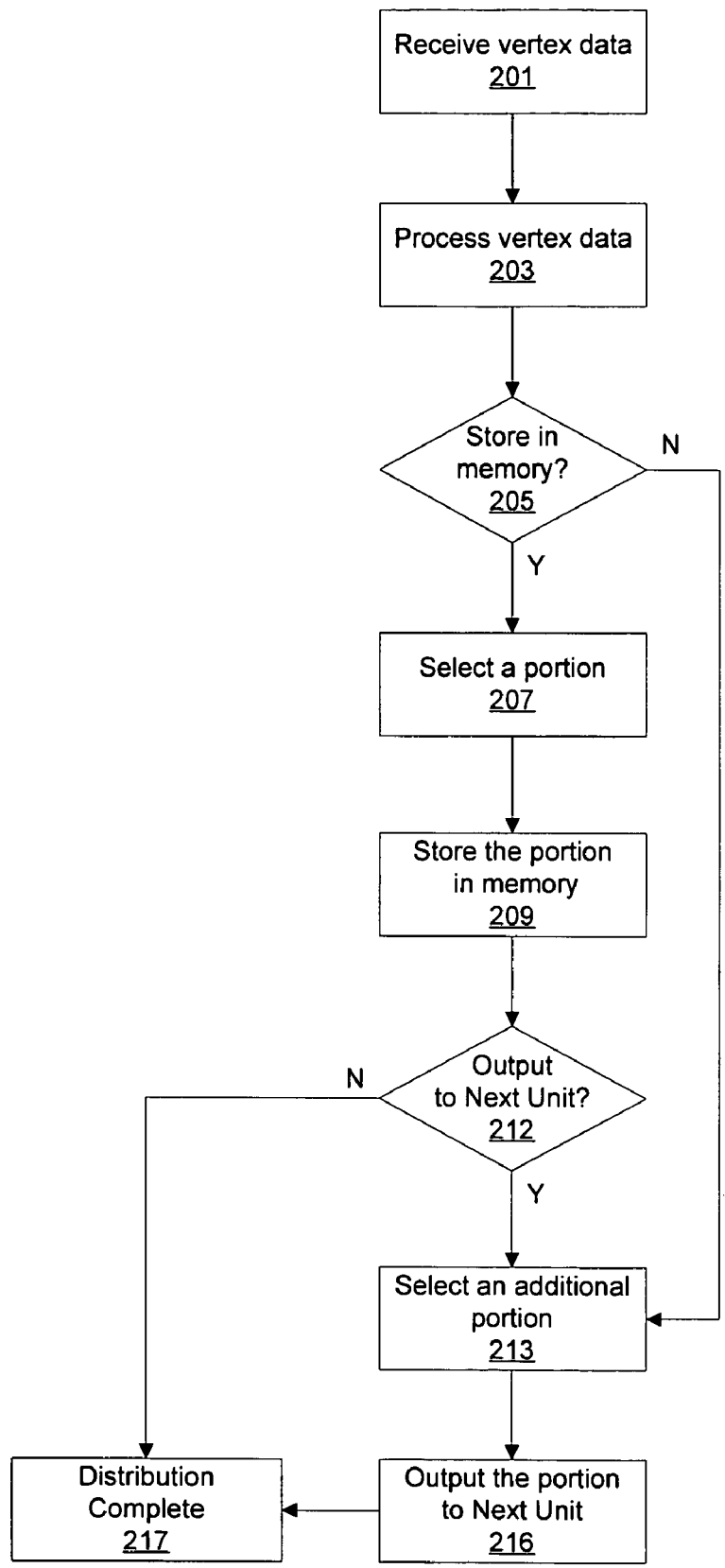
FIG. 2E is flow diagram of an exemplary embodiment of processing and distributing vertex data in accordance with one or more aspects of the present invention.

FIG. 2E is a flow diagram of an exemplary embodiment of processing and distributing vertex data. In step 201 Vertex Engine 230 receives vertex data from Vertex Input Buffer 225 or, alternatively, from graphics memory via Memory Controller 120. Likewise, Viewport Unit 250 receives processed vertex data from Vertex Engine 230 and Primitive Assembly/Setup 260 received further processed vertex data from Viewport Unit 250. In step 203 Vertex Engine 230 processes the vertex data to produce processed vertex data.

Likewise, Viewport Unit 250 further processes the processed vertex data received from Vertex Engine 230 and Primitive Assembly/Setup 260 filters the further processed data received from Viewport Unit 250.

In step 205 Vertex Engine 230 determines if a first portion of the processed vertex data should be stored in a memory, and, if not, proceeds to step 213. If in step 205 Vertex Engine 230 determines the first portion of the processed vertex data should be stored in the memory, in step 207 Vertex Engine 230 selects the first portion of the processed vertex data. In step 209, Vertex Engine 230 outputs the first portion of the processed vertex data to Memory Controller 120 and the first portion of the processed vertex data is stored in the memory. Likewise, in step 205 Viewport Unit 250 determines if a first portion of the further processed vertex data should be stored in the memory, and, if not, proceeds to step 213. If in step 205 Viewport Unit 250 determines the first portion of the further processed vertex data should be stored in the memory, in step 207 Viewport Unit 250 selects the first portion of the further processed vertex data. In step 209, Viewport Unit 250 outputs the first portion of the further processed vertex data to Memory Controller 120 and the first portion of the further processed vertex data is stored in the memory.

In step 212 Vertex Engine 230 determines if a second portion of the processed vertex data should be output to a next unit, e.g., Viewport Unit 250, and, if not, proceeds to step 217. If in step 211 Vertex Engine 230 determines a second portion of the processed vertex data should be output to Viewport Unit 250, Vertex Engine 230 proceeds to step 213. In one embodiment, the second portion of the processed vertex data is the same as the first portion of the processed vertex data. In a second embodiment the second portion of the processed vertex data is exclusive of the first portion of the processed vertex data. In a third embodiment the second portion of the processed vertex data includes at least some of the first portion of the processed vertex data. In a fourth embodiment the first portion of the processed vertex data includes at least some of the second portion of the processed vertex data.

Likewise, in step 212 Viewport Unit 250 determines if a second portion of the further processed vertex data should be output to a next unit, e.g., Primitive Assembly/Setup 260, and, if not, proceeds to step 217. If in step 211 Viewport Unit 250 determines a second portion of the further processed vertex data should be output to Primitive Assembly/Setup 260, Viewport Unit 250 proceeds to step 213. In one embodiment, the second portion of the further processed vertex data is the same as the first portion of the further processed vertex data. In a second embodiment the second portion of the further processed vertex data is exclusive of the first portion of the further processed vertex data. In a third embodiment the second portion of the further processed vertex data includes at least some of the first portion of the further processed vertex data. In a fourth embodiment the first portion of the further processed vertex data includes at least some of the second portion of the futher processed vertex data.

In step 213 Vertex Engine 230 selects the second portion of the processed vertex data. In step 216, Vertex Engine 230 outputs the second portion of the processed vertex data to a next unit, e.g., Viewport Unit 250. In step 217 Vertex Engine 230 is done processing and distributing the vertex data. Likewise, in step 213 Viewport Unit 250 selects the second portion of the further processed vertex data. In step 216, Viewport Unit 250 outputs the second portion of the further processed vertex data to a next unit, e.g., Primitive Assembly/Setup 260. In step 217 Viewport Unit 250 is done further processing and distributing the further processed vertex data.

Figure 2F:
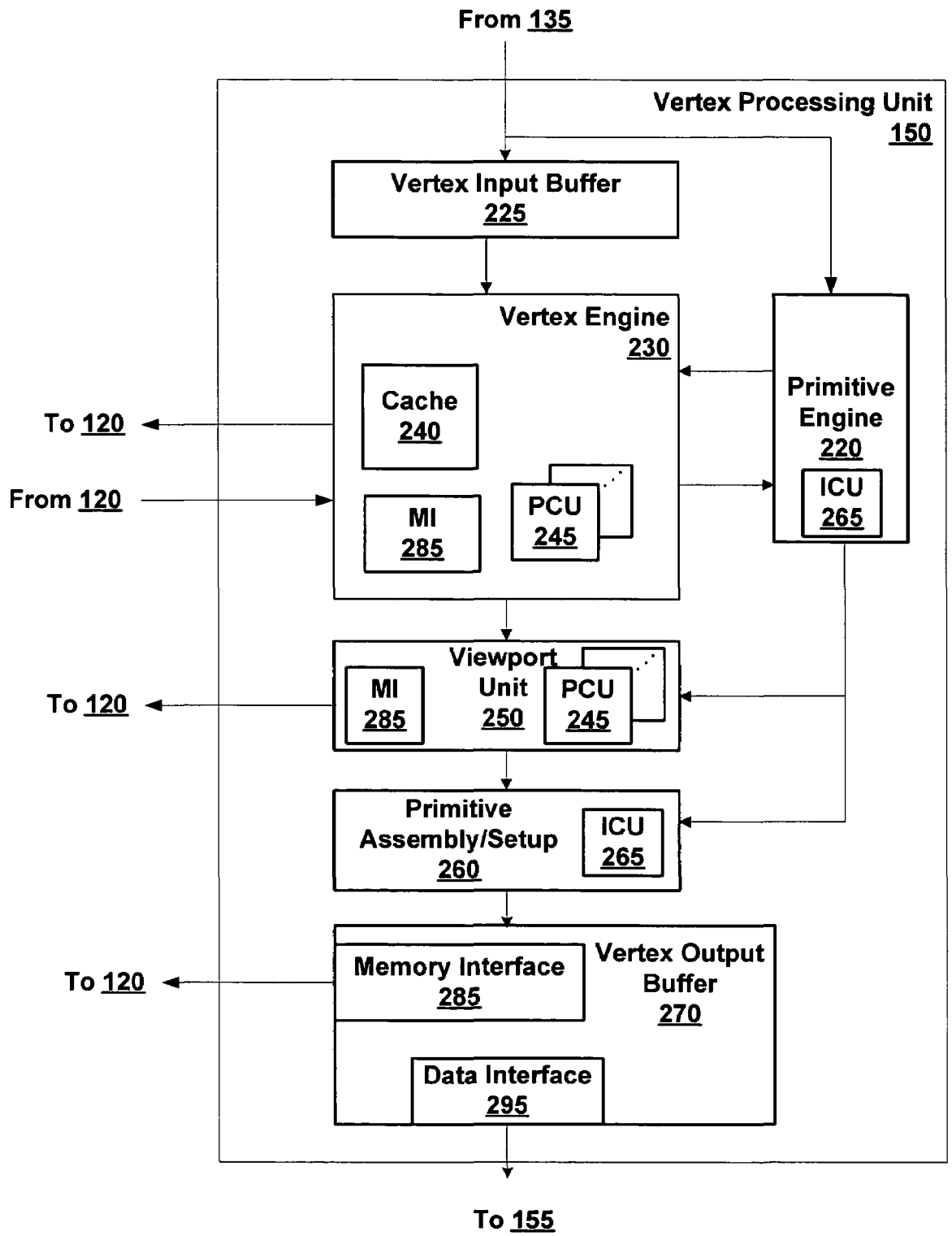
FIG. 2F is a block diagram of an exemplary embodiment of a vertex processing unit in accordance with one or more aspects of the present invention.

FIG. 2F is a block diagram of another alternate embodiment of Vertex Processing Unit 150. In this alternate embodiment, Vertex Processing Unit 150 includes several Memory interfaces (MI) 285. Vertex Processing Unit 150 receives program instructions and data and outputs processed, further processed, and filtered vertex data. At least a portion of the processed and further processed vertex data may be output from one or more of the Memory Interfaces 285 and stored in graphics memory. The filtered vertex data is output by Data Interface 295 to Rasterizer 155. It is desirable to store at least a portion of the processed and further processed vertex data to be used in subsequent passes through Vertex Processing Unit 150 rather than to regenerate one or more portions of processed and further processed vertex data for each pass. Writing one or more portions of processed vertex data from Vertex Engine 230 to graphics memory via Memory Controller 120 permits the one or more portions of processed vertex data to be stored while allowing the processed vertex data to be simultaneously further processed by Viewport Unit 250. Likewise, writing one or more portions of further processed vertex data from Viewport Unit 250 to graphics memory via Memory Controller 120 permits the one or more portions of processed vertex data to be stored while allowing the further processed vertex data to be simultaneously further processed by Primitive Assembly/Setup 260 and Vertex Output Buffer 270.

Vertex Engine 230, Viewport Unit 250, and Primitive Engine 220 each receive indices from an ICU (Index Computation Unit) 265 within Primitive Engine 220. The indices may be used to determine the location the processed, the further processed, or the filtered vertex data is optionally written to in graphics memory. In an alternate embodiment, Vertex Engine 230 and Viewport Unit 250 each generate the indices using an ICU 265 (not shown) using information from Primitive Engine 220 indicating which processed and further processed vertex data to write to graphics memory. In the alternate embodiment, Primitive Assembly/Setup 260 generates the indices using an ICU 265 within Primitive Assembly/Setup 260 and receives information from Primitive Engine 220 indicating which filtered vertex data to write to graphics memory.

Figure 3A:
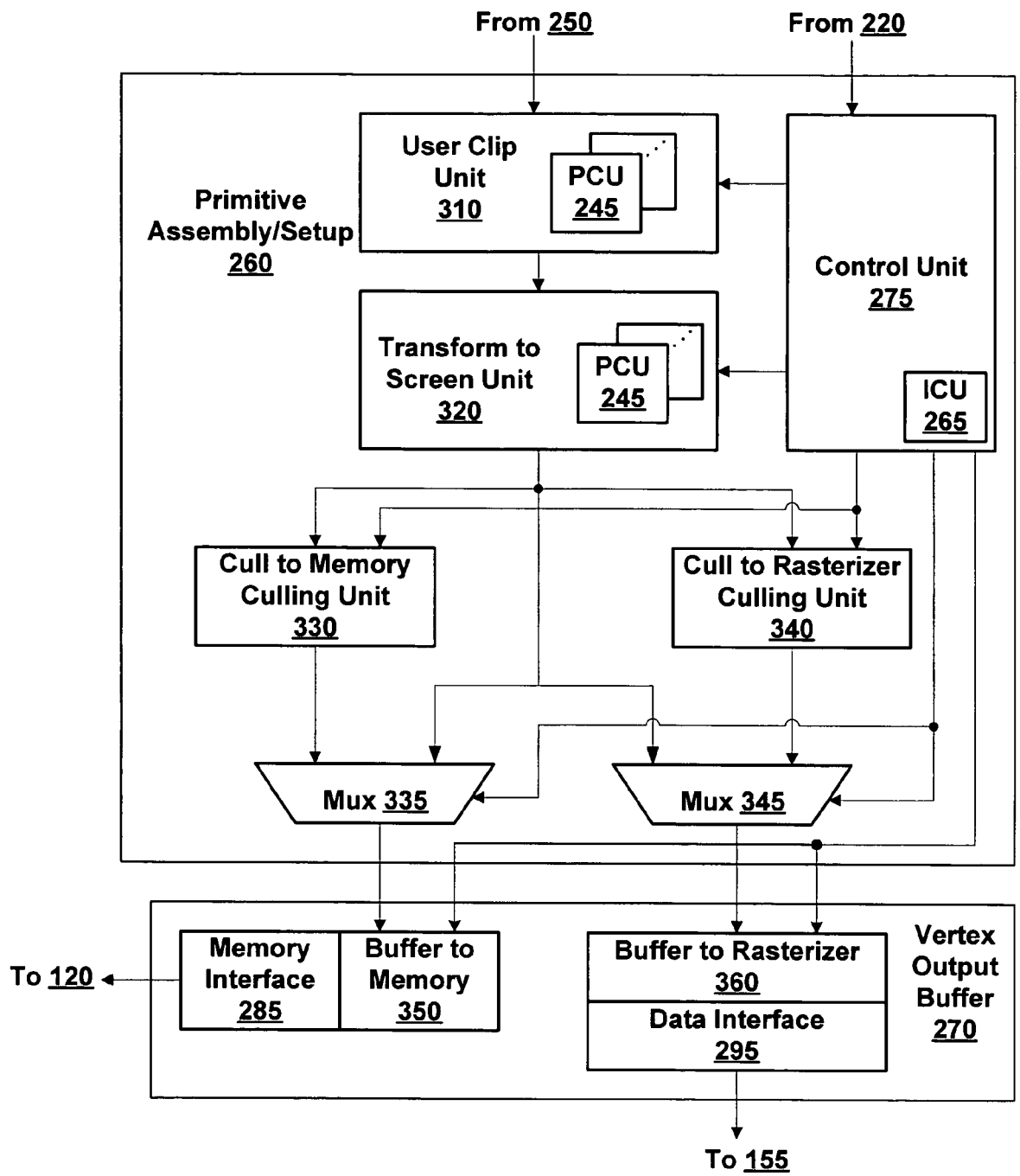
FIG. 3A is a block diagram of an exemplary embodiment of a portion of the vertex processing unit in accordance with one or more aspects of the present invention.

FIG. 3A is a block diagram of an exemplary embodiment of Viewport Unit 250 and Primitive Assembly/Setup 260. Control Unit 275 receives indices and other configuration information from Primitive Engine 220. Control Unit 275 outputs configuration signals to a User Clip Unit 310, a Transform to Screen Unit 320, a Cull to Memory Culling Unit 330, a Cull to Rasterizer Culling Unit 340, a Buffer to Memory 350, a Buffer to Rasterizer 360, a Mux 335 and a Mux 345. Additionally, Control Unit 275 outputs indices produced by ICU 265 to Buffer to Memory 350. The configuration information can be derived from vertex program instructions or controlled by mode bits written via one or more register write instructions independent from a vertex program.

User Clip Unit 310 receives further processed vertex data from Viewport Unit 250 and configuration information from Control Unit 275. User Clip Unit 310 optionally clips the processed and filtered vertex data using clip planes and outputs optionally clipped vertex data to Transform to Screen Unit 320. Transform to Screen Unit 320 optionally transforms the optionally clipped vertex data to screen space and outputs transformed clipped vertex data. Transform to Screen Unit 320 receives configuration information from Control Unit 275 to control and enable or disable the screen transformation operation.

Culling unit, Cull to Memory Culling Unit 330 receives the transformed clipped vertex data output by Transform to Screen Unit 320 and culls processed and filtered vertex data based on at least one programmable culling criterion such as backfacing/frontfacing, view frustrum space and scissor test. Cull to Memory Culling Unit 330 receives configuration signals from Control Unit 275 to select the one or more culling criterion and outputs culled vertex data to be written to graphics memory.

Culling unit, Cull to Rasterizer Culling Unit 340 receives the transformed clipped vertex data output by Transform to Screen Unit 320 and culls processed and filtered vertex data based at least one programmable culling criterion such as backfacing/frontfacing, view frustrum space and scissor test. In one embodiment Cull to Rasterizer Culling Unit 340 is identical to Cull to Memory Culling Unit 330. In an alternate embodiment Cull to Rasterizer Culling Unit 340 and Cull to Memory Culling Unit 330 are combined into a single unit that outputs a single stream of culled vertex data to Mux 335 and to Mux 345. Like Cull to Memory Culling Unit 330, Cull to Rasterizer Culling Unit 340 receives configuration signals from Control Unit 275 to select the at least one culling criterion and outputs culled vertex data to be output to Rasterizer 155.

Mux 335 receives configuration information from Control Unit 275 to output processed and filtered vertex data, selecting either culled vertex data from Cull to Memory Culling Unit 330 or transformed clipped vertex data from Transform to Screen Unit 320 as the first vertex data output. Likewise, Mux 345 receives configuration information from Control Unit 275 to output the second vertex data output, selecting either culled vertex data from Cull to Rasterizer Culling Unit 340 or transformed clipped vertex data from Transform to Screen Unit 320 as the second vertex data output. In an alternate embodiment Mux 335 and Mux 345 are omitted and Cull to Memory Culling Unit 330 and Cull to Rasterizer Culling Unit 340 can each be configured to output the transformed clipped vertex data.

Buffer to Memory 350 receives the first vertex data outputfrom Mux 335. Buffer to Memory 350 also receives indices from Control Unit 275. Buffer to Memory 350 is storage resources such as a register file, FIFO, cache, and the like, for storing the first vertex data output and indices. Buffer to Memory 350 outputs the first vertex data output and indices to Memory Interface 285. Memory Interface 285 includes a write interface to generate write requests. In an alternate embodiment Buffer to Memory 350 is omitted and Mux 335 is coupled to Memory Interface 285.

Buffer to Rasterizer 360 receives the second vertex data output from Mux 345. Buffer to Rasterizer 360 is storage resources such as a register file, FIFO, cache, and the like. Buffer to Rasterizer 360 outputs the second vertex data output to Data Interface 295. Data Interface 295 outputs the second vertex data output to Rasterizer 155. In an alternate embodiment Buffer to Rasterizer 360 is omitted and Mux 345 is coupled to Rasterizer 155.

The second vertex data output output by Buffer to Rasterizer 360 can be different from the first vertex data output output by Buffer to Memory 350 depending on the culling criteria used by Cull to Memory Unit 330 and the culling criteria used by Cull to Rasterizer Unit 340. The culling criteria can be controlled by vertex program instructions or by mode bits written by a device driver via one or more register write instructions independent from a vertex program. Likewise, the selection of non-culled vertex data, i.e., transformed clipped vertex data from Transform to Screen Unit 320, as the first vertex data output output by Mux 335 or the second vertex data output output by Mux 345 can be controlled by vertex program instructions or by mode bits written by the device driver via one or more register write instructions independent from a vertex program.

Figure 3B:
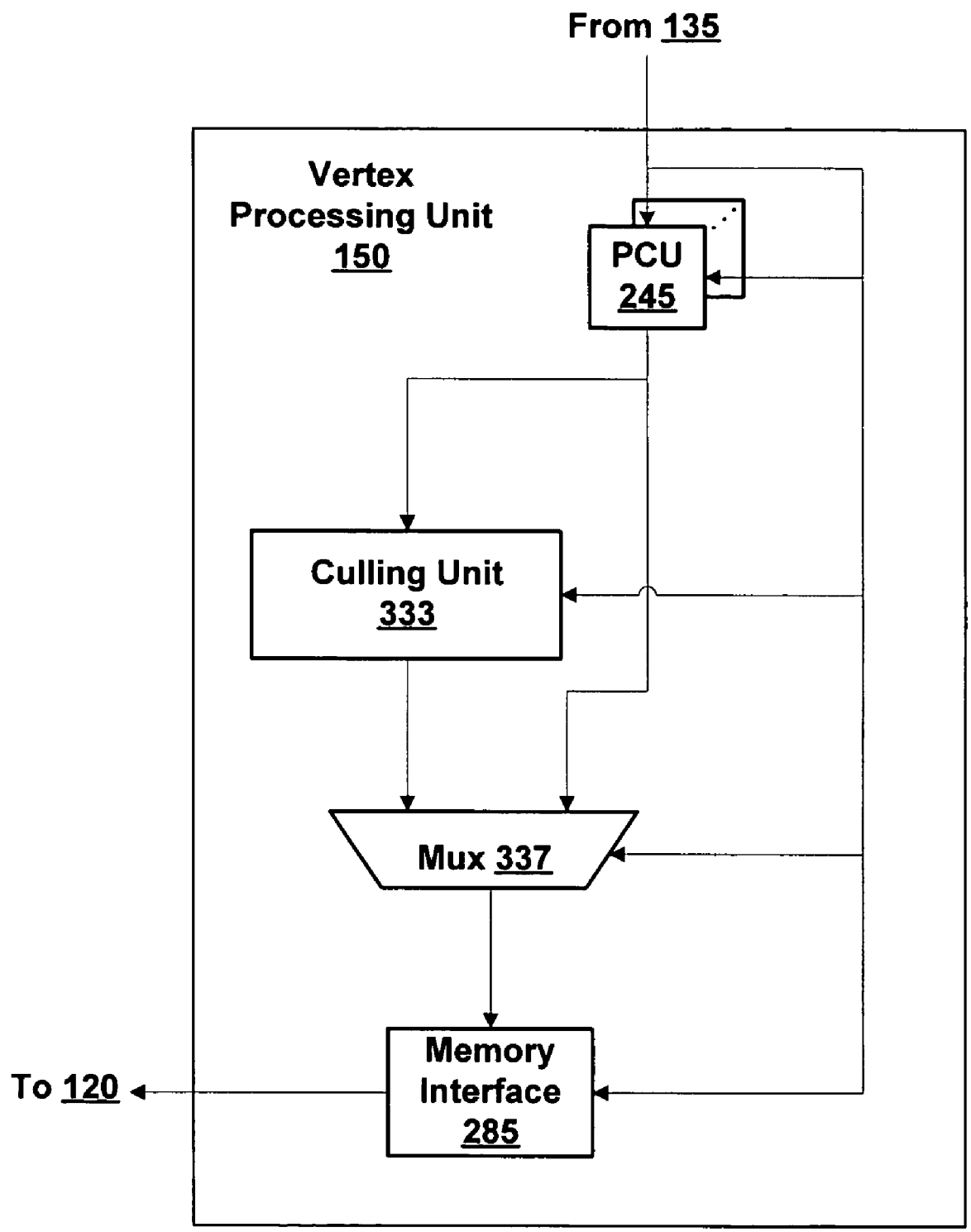
FIGS. 3B, 3C and 3D are block diagrams of exemplary embodiments of the vertex processing unit in accordance with one or more aspects of the present invention.

FIG. 3B is a block diagram of an alternate embodiment of Vertex Processing Unit 150. In this alternate embodiment at least one PCU 245 is used perform matrix transformations, lighting operations, vector calculations, tessellation, viewport transformations, user clipping, transformations to screen coordinates, and the like. The at least one PCU 245 receives vertex data input and produces vertex data output. A Culling Unit 333 receives the vertex data output and produces filtered vertex data output. A Mux 337 selects one of the filtered vertex data output and the vertex data output for output to Memory Interface 285. Memory Interface 285 stores the one of the filtered vertex data output and the vertex data output in graphics memory via Memory Controller 120.

Figure 3C:
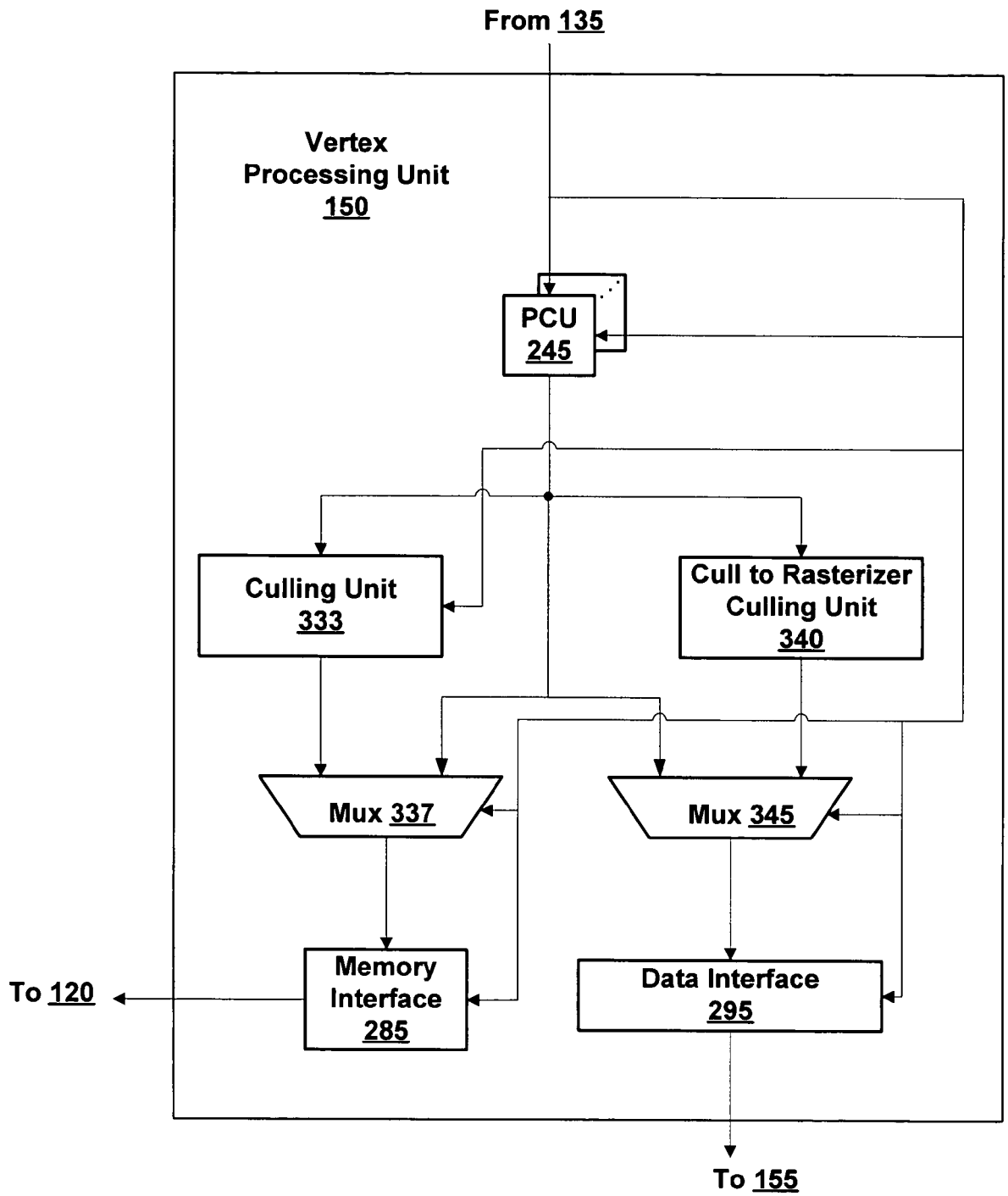

FIG. 3C is a block diagram of another alternate embodiment of Vertex Processing Unit 150. In addition to the blocks shown in FIG. 3B this alternate embodiment includes Cull to Rasterizer Culling Unit 340, Mux 345 and Data Interface 295 are included in Vertex Processing Unit 150. Cull to Rasterizer Culling Unit 3 receives the vertex data output and produces filtered vertex data output. Mux 345 selects one of the filtered vertex data output and the vertex data output for output to Data Interface 295.

Figure 3D:
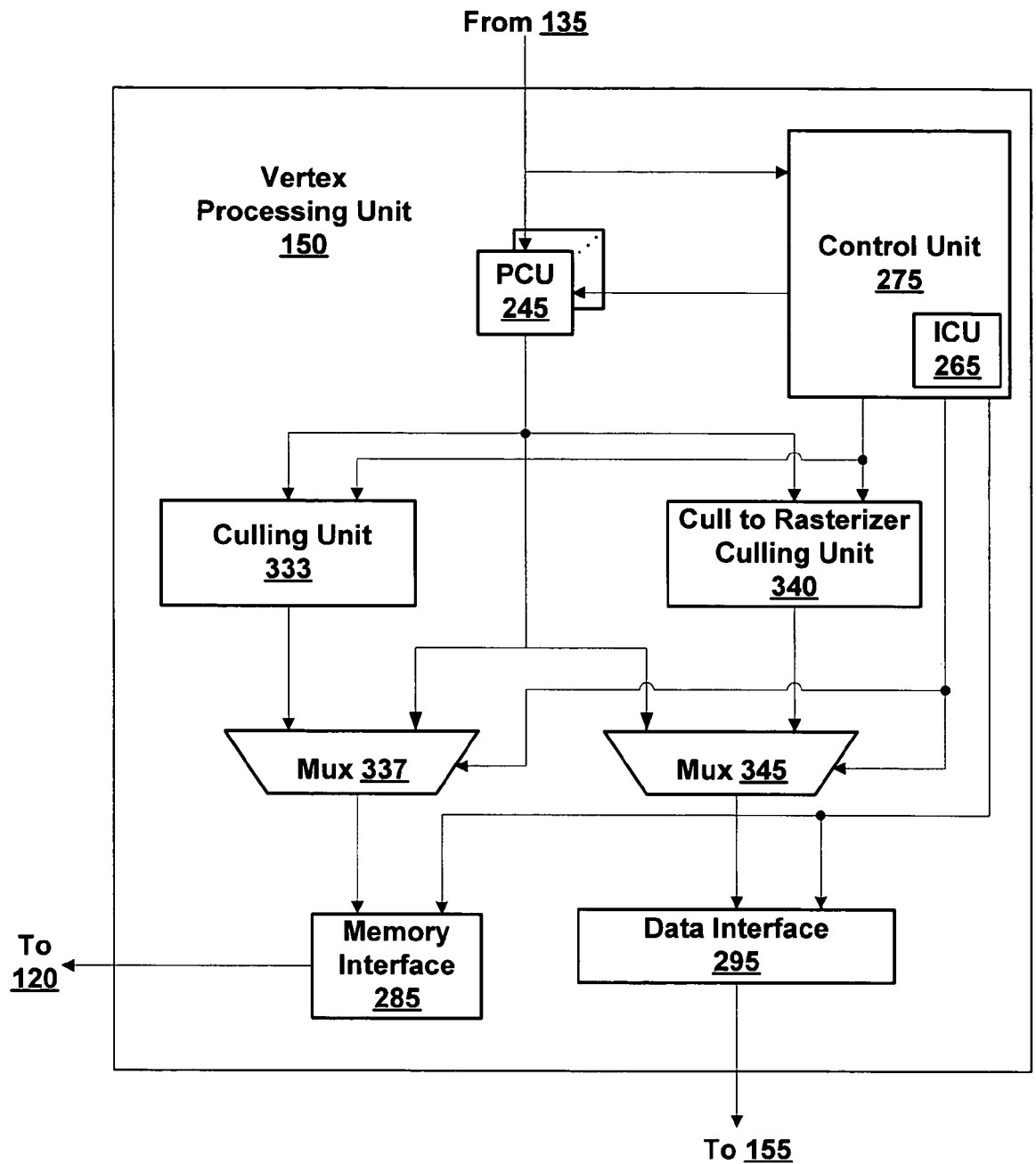

FIG. 3D is a block diagram of another alternate embodiment of Vertex Processing Unit 150. In addition to the blocks shown in FIG. 3C this alternate embodiment includes Control Unit 275.

Figure 4:
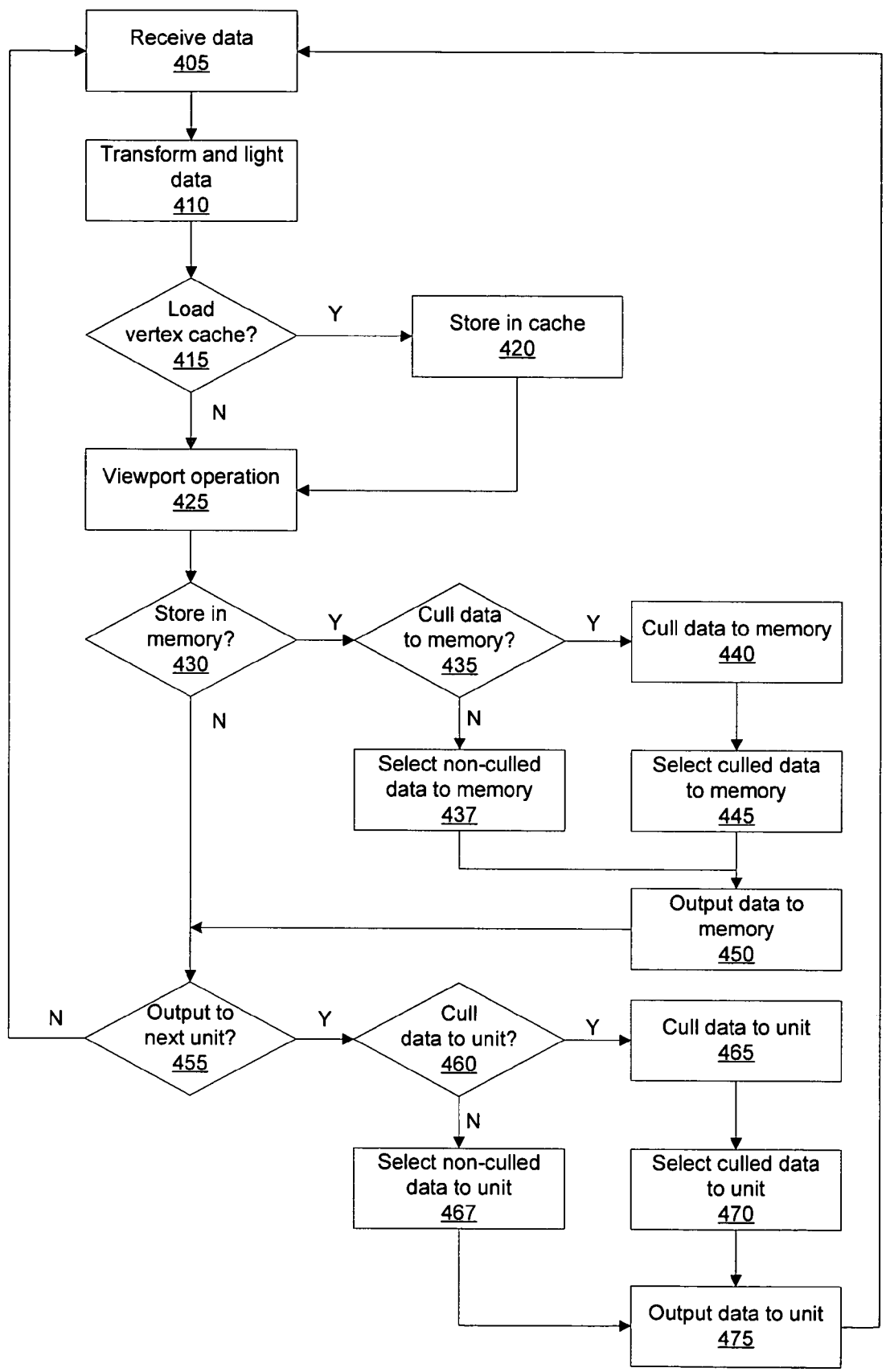
FIG. 4 is a flow diagram of exemplary embodiments of vertex data processing in accordance with one or more aspects of the present invention.

FIG. 4 is a flow diagram of exemplary embodiments of vertex shading processes in accordance with one or more aspects of the present invention. In step 405 Vertex Engine 230 receives vertex data from IDX 135. In an alternate embodiment Vertex Engine 230 receives vertex data from graphics memory via Memory Controller 120. In step 410 Vertex Engine 230 performs matrix transformations and lighting operations using vertex data as configured by Primitive Engine 220 to produce transformed and lit vertex data. In step 415 Vertex Engine 230 determines if the transformed and lit vertex data will be loaded into Cache 240, and, if so, in step 420 the transformed and lit vertex data is loaded into Cache 240 and Vertex Engine 230 proceeds to step 425. If in step 415 Vertex Engine 230 determines the transformed and lit vertex data will not be loaded into Cache 240 and Vertex Engine 230 proceeds to step 425. Continuing in step 425, the transformed and lit vertex data is output from Vertex Engine 230 to Viewport Unit 250 which processes the transformed and lit vertex data and outputs further processed vertex data to Primitive Assembly/Setup 260. In step 425 Primitive Assembly/Setup 260 optionally clips and transforms the further processed vertex data and generates transformed clipped vertex data.

In step 430 Primitive Assembly/Setup 260 determines if the transformed clipped vertex data will be stored in graphics memory, and, if so, in step 435 Primitive Assembly/Setup 260 determines if the transformed clipped vertex data will be culled. If in step 435 Primitive Assembly/Setup 260 determines the transformed clipped vertex data will be culled, in step 440 Primitive Assembly/Setup 260 generates culled vertex data to be written to graphics memory. In step 445 Primitive Assembly/Setup 260 selects the culled vertex data as filtered vertex data to be written to graphics memory and proceeds to step 450. If in step 435 Primitive Assembly/

Setup 260 determines the transformed clipped vertex data will not be culled, in step 437 Primitive Assembly/Setup 260 selects the transformed clipped vertex data as the filtered vertex data to be written to graphics memory and proceeds to step 450. In step 450 Primitive Assembly/Setup 260 outputs the filtered vertex data to be written to graphics memory to Vertex Output Buffer 270. The filtered vertex data to be written to graphics memory is written to graphics memory as described further herein and Primitive Assembly/Setup 260 proceeds to step 455.

If in step 430 Primitive Assembly/Setup 260 determines the transformed clipped vertex data will not be stored in graphics memory, Primitive Assembly/Setup 260 proceeds to step 455. In step 455 Primitive Assembly/Setup 260 determines if the transformed clipped vertex data will be output to a next unit, e.g., Rasterizer 155, and, if so, in step 460 Primitive Assembly/Setup 260 determines if the transformed clipped vertex data will be culled. If in step 455 Primitive Assembly/Setup 260 determines the transformed clipped vertex data will not be output to a next unit, processing continues with step 405. Continuing in step 460, if Primitive Assembly/Setup 260 determines the transformed clipped vertex data will be culled, in step 465 Primitive Assembly/Setup 260 generates culled vertex data to be written to the next unit. In step 470 Primitive Assembly/Setup 260 selects the culled vertex data as filtered vertex data to be output to the next unit and proceeds to step 475.

If in step 460 Primitive Assembly/Setup 260 determines the transformed clipped vertex data will not be culled, in step 467 Primitive Assembly/Setup 260 selects the transformed clipped vertex data as the filtered vertex data to be output to the next unit and proceeds to step 475. In step 475 Primitive Assembly/Setup 260 outputs the filtered vertex data to be output to the next unit to Vertex Output Buffer 270. The filtered vertex data to be output to the next unit is output and processing continues with step 405. Vertex Processing Unit 150 can process additional vertex data or further process the filtered vertex data written to graphics memory while Rasterizer 155 and Pixel Shader 160 process the filtered vertex data received from Vertex Processing Unit 150.

Primitive Assembly/Setup 260 receives indices from Primitive Engine 220 that are used to determine the locations the filtered vertex data is optionally written to in graphics memory. In one embodiment, vertex data loaded into Cache 240 is also written to graphics memory. The indices or cache addresses can be specified in the vertex program or generated by a computation unit within Graphics Processing Pipeline 103. For example, cache addresses within Cache 240 are specified in a vertex program and the cache addresses are combined with a graphics memory location, e.g., base address, to generate indices specifying locations, e.g., physical addresses, within graphics memory. Alternatively, the indices are generated by IDX 135, Primitive Engine 220 or Primitive Assembly/Setup 260 by adding a value to a base address specifying a location within graphics memory. The value can be a sequential count, an offset specified by a vertex program, or the like.

Figure 5:
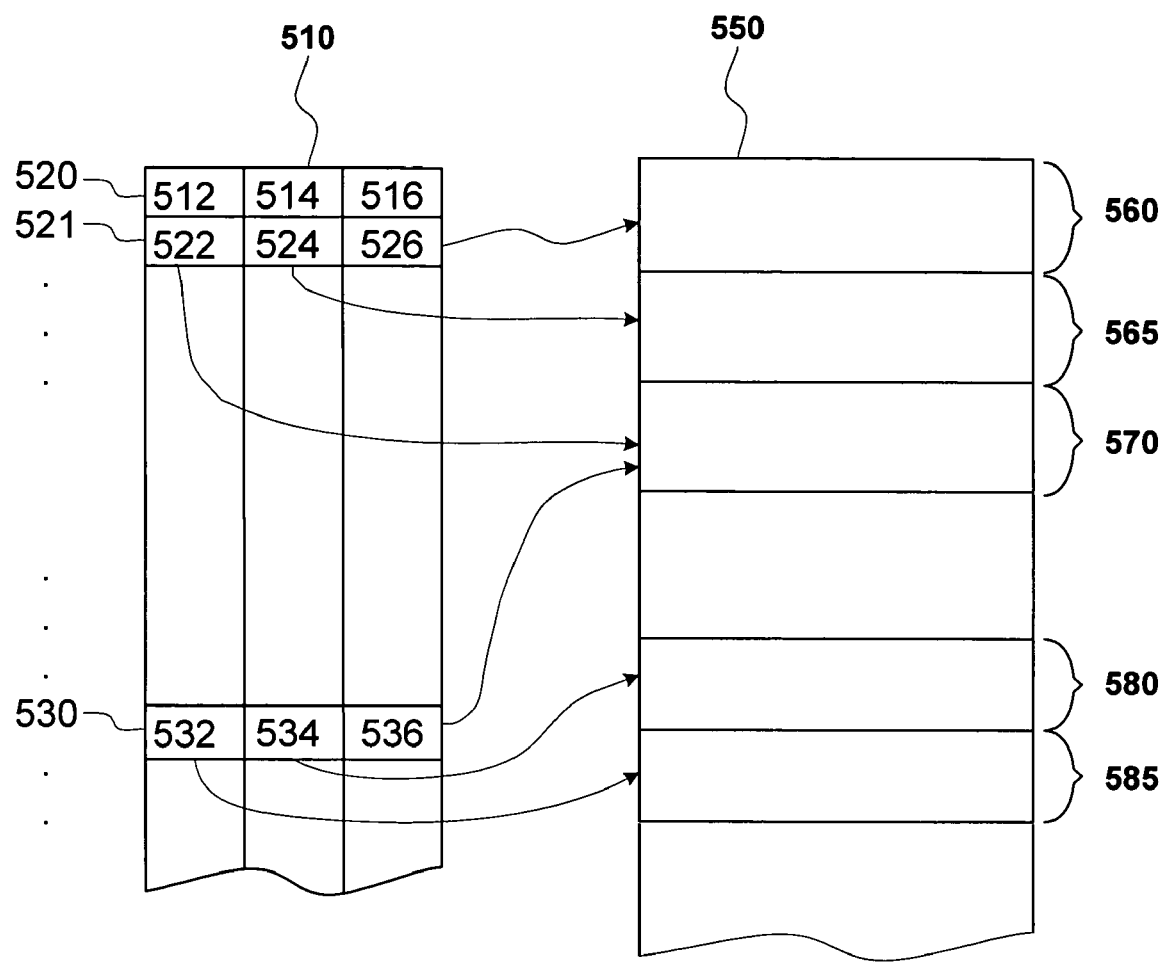
FIG. 5 is a diagram of an exemplary embodiment of a portion of graphics memory storing data output by the vertex processing unit.

FIG. 5 is a diagram of an exemplary embodiment of a portion of graphics memory storing vertex data output by Vertex Processing Unit 150. A Table 510 contains an entry for each primitive. An Entry 521 contains three vertex pointers: a Pointer 522; a Pointer 524; and a Pointer 526. The number of vertex pointers stored in an entry can vary dependent on the type of primitive used. For example, an entry for a triangle primitive stores three vertex pointers and an entry for a quad stores four vertex pointers. Each vertex pointer directly or indirectly specifies the location of vertex data in graphics memory and can be one of a physical address, an offset of a base address, an offset of another vertex pointer, or the like.

Table 510 can be stored in graphics memory or in storage resources within Vertex Processing Unit 150. Table 510 is used to determine the location of vertex data stored in graphics memory. Table 510 is updated when vertex data is written to graphics memory and Table 510 is read when vertex data is read from graphics memory. In a first embodiment Table 510 is shared by IDX 135 and Vertex Processing Unit 150. In a second embodiment IDX 135 and Vertex Processing Unit 150 each contain a Table 510. In a third embodiment IDX 135 does not read vertex data from graphics memory and Table 510 is contained in Vertex Processing Unit 150.

In FIG. 5 a Graphics Memory Portion 550 stores the vertex data. The vertex data includes at least one of geometric coordinates, color, map indices, time-based derivatives, user-defined parameters, and the like. Pointer 522 specifies the location of Vertex Data 570 in Graphics Memory Portion 550. Pointer 524 specifies the location of Vertex Data 565 in Graphics Memory Portion 550. Pointer 526 specifies the location of Vertex Data 560 in Graphics Memory Portion 550. A Pointer 536 within an Entry 530 also specifies the location of Vertex Data 570. Alternatively, Vertex Data 570 is redundantly stored at an additional location specified by Pointer 536.

Vertex data generated by Vertex Processing Unit 150 is optionally output to one of Rasterizer 155 and graphics memory. For example, vertex data generated during a first pass through Vertex Processing Unit 150 is read from graphics memory and processed by Vertex Processing Unit 150 in a second pass while at least a portion of the vertex data generated during the first pass through Vertex Processing Unit 150 is received and processed by Rasterizer 155.

Figure 6A:
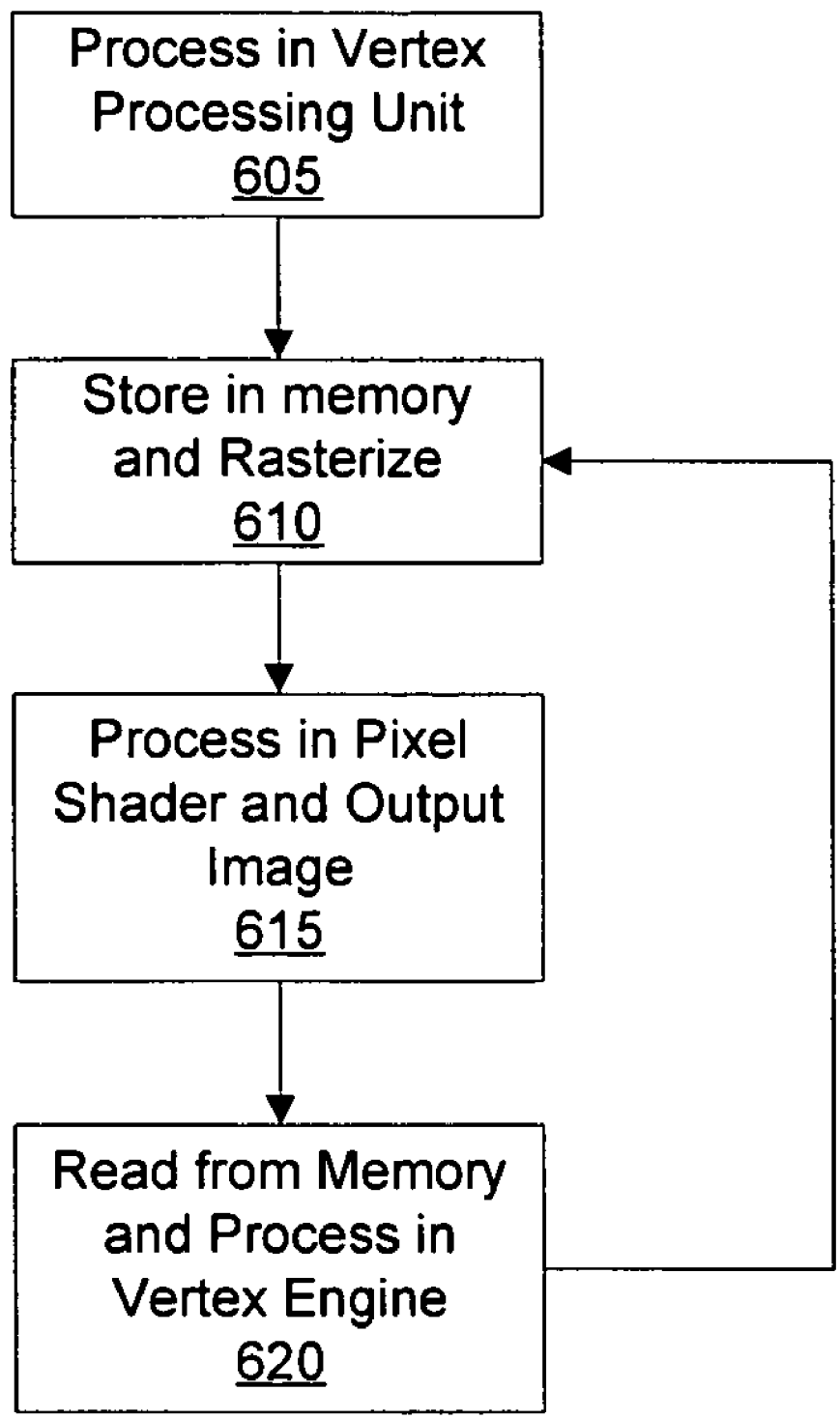
FIGS. 6A and 6B are flow diagrams of exemplary embodiments of data processing to generate output images in accordance with one ore more aspects of the present invention.

FIG. 6A is a flow diagram of an exemplary embodiment of vertex data processing to generate output images by reprocessing the vertex data. In step 605 the vertex data is processed in Vertex Processing Unit 150. Vertex Processing Unit 150 generates a first portion and a second portion of processed vertex data. In step 610 the first portion is stored in graphics memory by Vertex Processing Unit 150 and the second portion is output to Rasterizer 155. In step 610 the second portion is processed by Rasterizer 155 to generate samples. The ability of Vertex Processing Unit 150 to write the first portion to graphics memory can reduce the number of processing passes through Graphics Processing Pipeline 103 to generate a output image.

For example, when the first portion is used to produce several images, during the first processing pass the first portion and the second portion are the same. The first portion is stored in graphics memory while the second portion is processed in Rasterizer 155, Pixel Shader 160 and Raster Analyzer 165 to produce the output image. In a subsequent processing pass or passes the first portion is read from graphics memory and processed in Rasterizer 155, Pixel Shader 160 and Raster Analyzer 165 to produce additional output images. In another example, the first portion is reprocessed in Vertex Processing Unit 150 one or more times to produce the second portion. The second portion is output to and processed in Rasterizer 155, Pixel Shader 160 and Raster Analyzer 165 to produce the output image. The reprocessed first portion is also stored in graphics memory to be read by Vertex Processing Unit 150 or Pixel Shader 160 to produce additional output images.

Continuing in step 615 the samples are received and processed by Pixel Shader 160. Pixel Shader 160 generates processed samples that are received by Raster Analyzer 165. Raster Analyzer 165 generates the output image that is read and output by Output Controller 180. Step 620 can be completed concurrently with step 615. In step 620, the first portion of vertex data is read from graphics memory by Vertex Processing Unit 150. Vertex Processing Unit 150 further processes the first portion of vertex data to generate a further processed a further processed first portion of vertex data and a further processed a further processed second portion of vertex data. Steps 610, 615 and 620 are repeated to generate additional output images.

Alternatively the programmable computation units within Vertex Processing Unit 150 can be configured to perform tessellation functions. Vertices generated during tessellation are output by Vertex Processing Unit 150 to Rasterizer 155 and are optionally written to graphics memory. The vertices generated during tessellation can be used to generate multiple output images. For example, during displacement mapping, the vertices generated during tessellation in Vertex Processing Unit 150 are written to graphics memory and passed through Rasterizer 155 to Pixel Shader 160. The vertices generated during tessellation are displaced by Pixel Shader 160 to produce displaced vertices in a first processing pass through Graphics Processing Pipeline 103. The displaced vertices are written to graphics memory by Raster Analyzer 165 at the conclusion of the first pass through Graphics Processing Pipeline 103. The displaced vertices are subsequently read from graphics memory and processed by Vertex Processing Unit 150 and Rasterizer 155 to generate samples. The samples are processed by Pixel Shader 160 and Raster Analyzer 165 to generate a first output image. While Rasterizer 155 is generating samples, Vertex Processing Unit 150 reads the vertices generated during tessellation during the first pass through Vertex Processing Unit 150 to begin generation of a second output image.

Figure 6B:
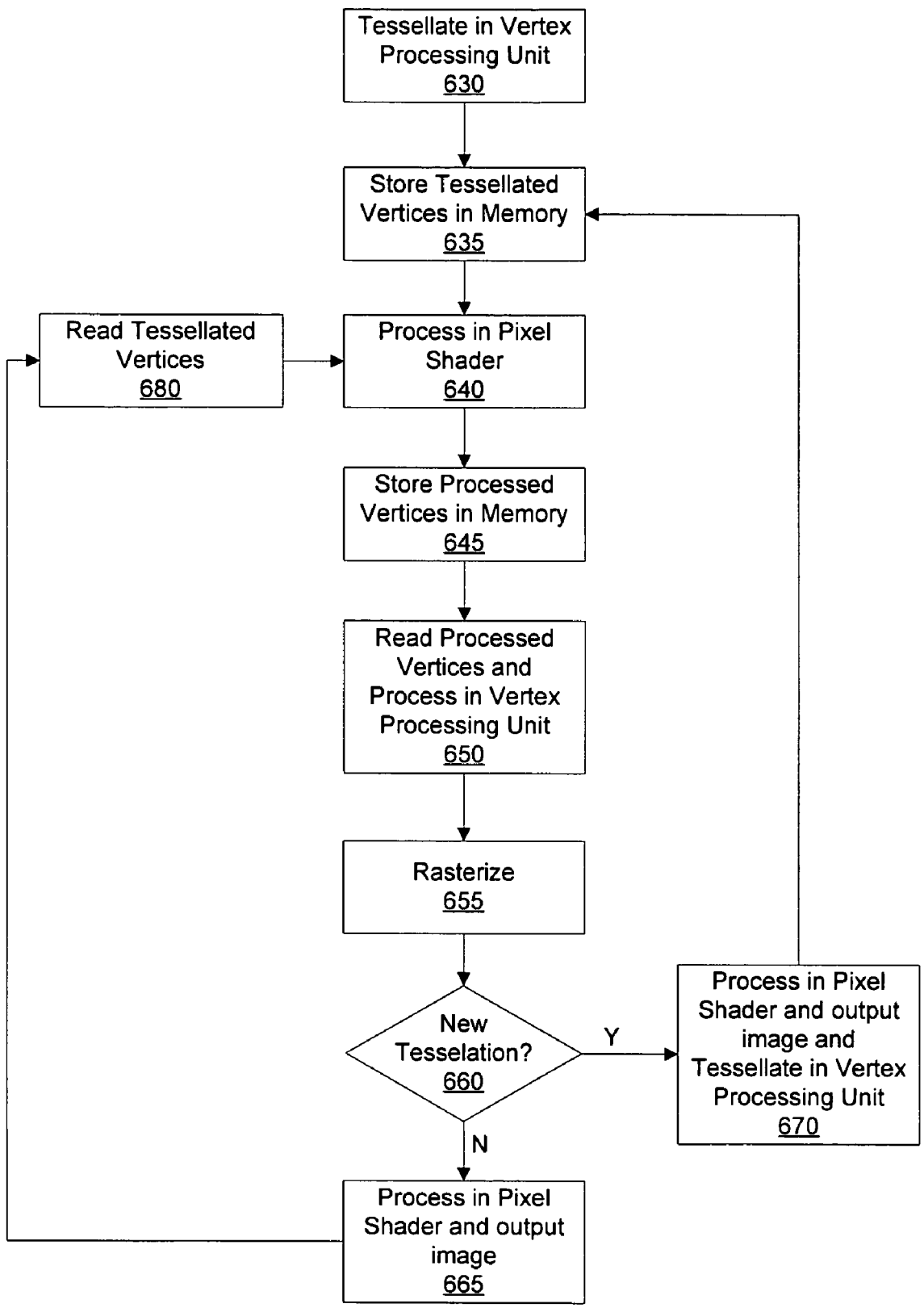

FIG. 6B is a flow diagram of an exemplary embodiment of data processing to generate output images using vertex data generated during tessellation in Vertex Processing Unit 150. In step 630 Vertex Processing Unit 150 generates tessellated vertices and outputs a first portion of tessellated vertex data and a second portion of tessellated vertex data. In step 635 the first portion is stored in graphics memory by Vertex Processing Unit 150. In step 640 the second portion is received by Rasterizer 155, passed through Rasterizer 155 and processed by Pixel Shader 160 to generate processed vertex data. In step 645 Pixel Shader 160 outputs the processed vertex data to Raster Analyzer 165 and the processed vertex data is stored in graphics memory by Raster Analyzer 165, completing the first pass through Graphics Processing Pipeline 103.

The second pass through Graphics Processing Pipeline 103 begins in step 650 when Vertex Processing Unit 150 reads and further processes the processed vertex data to generate a second portion of further processed vertex data to Rasterizer 155. The second portion of further processed vertex data is output to Rasterizer 155 and in step 655 Rasterizer 155 generates samples and outputs the samples to Pixel Shader 160. In step 660 Vertex Processing Unit 150 determines if the next processing operation is tessellation, and, if not, in step 665 Pixel Shader 160 processes the samples. Pixel Shader 160 generates processed samples that are received by Raster Analyzer 165 and Raster Analyzer 165 generates a first output image that is read and output by Output Controller 180. In step 680 Vertex Processing Unit 150 reads the first portion from graphics memory and outputs the first portion to Rasterizer 155. Step 680 can be completed concurrently with step 665.

After step 680, steps 640, 645, are repeated for a first pass through Graphics Processing Pipeline 103 to generate a second output image. Steps 650 and 655 are repeated and in step 660 Vertex Processing Unit 150 determines if the next processing operation is tessellation, and, if so, in step 670 Pixel Shader 160 processes the samples generating processed samples that are received by Raster Analyzer 165. In step 670 Raster Analyzer 165 generates a second output image that is read and output by Output Controller 180. While Pixel Shader 160 is generating processed samples, Vertex Processing Unit 150 generates tessellated vertices and outputs a subsequent first portion of tessellated vertex data and a subsequent second portion of tessellated vertex data. After step 670, Vertex Processing Unit 150 continues processing in step 635.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners.

The invention claimed is:

1. A method for distributing processed vertex data for a graphics processor, comprising:
processing vertex data input to produce the processed vertex data comprising first and second portions;
selectively storing the first portion of the processed vertex data in a graphics memory so that further processing may be performed on the first portion of processed data;
filtering the processed vertex data to obtain the second portion of the processed vertex data;
selectively outputting the second portion of the processed vertex data directly to a rasterizer; and
wherein an index is used to determine whether the non-filtered data is stored in the graphics memory.

2. The method according to claim 1, further comprising outputting at least one index with each portion of the processed data used to determine at least one location in the memory for the first portion of the processed vertex data and the further processed first portion of the data.

3. The method according to claim 2, wherein the selectively storing and the selectively outputting are responsive to vertex program instructions.

4. The method according to claim 2, further comprising filtering the processed vertex data to obtain the first portion of the processed vertex data.

5. The method according to claim 4, wherein the filtering uses at least one of backface culling, frontface culling, view frustum space culling, user clip plane culling and scissor test culling.

6. The method according to claim 2, wherein the first portion of the processed vertex data is obtained by tessellating primitives defined by the vertex data.

7. The method according to claim 2, wherein the processed vertex data includes at least one time-based derivative.

8. A method as in claim 1 wherein the first portion is used to produce several images, the first portion and the second portion being the same, including
Storing the first portion in the graphics memory while the second portion is processed to produce an output image, the first portion then being read from the memory and reprocessed to produce additional output images.

9. A method as in claim 1 wherein the second portion is passed to a pixel shader to define an output image, the first portion being stored in buffer memory and thereafter processed and passed to the pixel shader.

10. A vertex processing unit, comprising:
at least one programmable computation unit configured to receive vertex data input to produce a first vertex data output and a second vertex data output;
a memory interface coupled to the at least one programmable computation unit for storing the first vertex data output in a graphics memory and further processing the first vertex data output in the vertex processing unit without regenerating the first vertex data output;
a data interface coupled to the at least one programmable computation unit for communicating the second vertex data output; and
an index computation unit configured to compute indices used to determine at least one location in the graphics memory for storing the first vertex data output and the further processed first vertex data output.

11. The vertex processing unit of claim 10, further comprising a cache configured to store at least a portion of the first vertex data output.

12. The vertex processing unit of claim 10, wherein the at least one programmable computation unit is further configured to generate at least a portion of the first vertex data output by tessellating primitives defined by the vertex data input.

13. The vertex processing unit of claim 10, wherein the at least one programmable computation unit is further configured to generate at least a portion of the second vertex data output by tessellating primitives defined by the vertex data input.

14. The vertex processing unit of claim 10, further comprising an additional data interface configured to obtain data stored in the graphics memory.

15. A vertex processing unit, comprising:
at least one programmable computation unit configured to receive vertex data input to produce vertex data output;
a culling unit coupled to the programmable computation unit to receive the vertex data output and to produce filtered vertex data output; and
a first memory interface for storing one of the vertex data output and the filtered vertex data output in a graphics memory to enable further processing of the vertex data output and the filtered data vertex data output without regeneration of the vertex data output,
a second data interface for transferring the vertex data output to the rasterizer; and
an index computation unit configured to compute indices used to determine at least one location in the graphics memory for storing the vertex data output and the filtered vertex data output, the indices also being used to determine whether the vertex data output and the filtered vertex data output are already stored in the graphics memory.

16. The vertex processing unit of claim 15, further comprising:
an additional culling unit coupled to the at least one programmable computation unit to receive the vertex data output to produce an additional filtered vertex data output; and
the second data interface outputting one of the vertex data output and the additional filtered vertex data output.

17. The vertex processing unit of claim 15, wherein the culling unit is configured to filter the vertex data output using at least one of backface culling, frontface culling, view frustum space culling, user clip plane culling and scissor test culling.

18. The vertex processing unit of claim 16, wherein the additional culling unit is configured to filter the vertex data output using at least one of backface culling, frontface culling, view frustum space culling, user clip plane culling and scissor test culling.

19. The vertex processing unit of claim 15, wherein the culling unit is configured to filter the vertex data output responsive to vertex program instructions.

20. The vertex processing unit of claim 15, wherein the storing one of the vertex data output and the filtered vertex data output is responsive to vertex program instructions.

21. The vertex processing unit of claim 16, wherein the data interface is coupled to a rasterizer.

22. The vertex processing unit of claim 15, wherein the vertex processing unit resides within a graphics processor.

23. A method for distributing processed vertex data for a graphics processor, comprising:
processing vertex data input to produce the processed vertex data comprising first and second portions;
selectively storing the first portion of the processed vertex data in a graphics memory so that further processing may be performed on the first portion of processed data; and
selectively outputting the second portion of the processed vertex data directly to a rasterizer,
wherein the first portion of the processed vertex data is generated during translation in a first pass through the shader and stored in the graphics memory, and is thereafter read from the graphics memory and processed by the shader in a second pass, and wherein the second portion of the processed vertex data comprises at least a part of the first portion.

* * * * *

UNITED STATES PATENT AND TRADEMARK OFFICE
CERTIFICATE OF CORRECTION

PATENT NO.         : 7,151,543 B1                                              Page 1 of 1
APPLICATION NO. : 10/704444
DATED              : December 19, 2006
INVENTOR(S)       : Moreton et al.

It is certified that error appears in the above-identified patent and that said Letters Patent is hereby corrected as shown below:

In column 16, line 16, please replace "fronfface", with --frontface--

Signed and Sealed this

Twenty Second Day of April, 2008

JON W. DUDAS
*Director of the United States Patent and Trademark Office*